United States Patent [19]

Mihalakis, deceased et al.

[11] 4,241,980
[45] Dec. 30, 1980

[54] BEAM EMISSION CONTROL MEANS

[75] Inventors: Agis I. Mihalakis, deceased, late of San Luis Obispo County, Calif.; by Barbara L. Friend, legal representative, Cody, Wyo.

[73] Assignee: William C. McGeehon, Canoga Park, Calif.

[21] Appl. No.: 908,988

[22] Filed: May 24, 1978

[51] Int. Cl.³ .............................................. G03B 21/60
[52] U.S. Cl. .................................................... 350/129
[58] Field of Search ........................ 350/117, 129, 125

[56] References Cited

U.S. PATENT DOCUMENTS

| | | | |
|---|---|---|---|
| 2,804,801 | 9/1957 | Mihalakis | 350/129 |
| 2,984,152 | 5/1961 | Mihalakis | 350/129 |
| 3,037,424 | 6/1962 | Capetta | 350/125 |
| 3,063,339 | 11/1962 | Mihalakis | 350/129 |
| 3,295,910 | 1/1967 | Hourdiaux | 350/129 X |
| 3,475,086 | 10/1969 | Vetter | 350/125 X |
| 3,809,457 | 5/1974 | Kurtz et al. | 350/129 X |

*Primary Examiner*—Richard A. Wintercorn
*Attorney, Agent, or Firm*—Lyon & Lyon

[57] ABSTRACT

An improved beam emission control means is disclosed for use in a projection system. The beam emission control means is constructed of highly reflective or transmissive materials in the form of an abutting matrix of a plurality of a single specially shaped element, the element having both convex and concave image-forming portions. The individual element typically has dimensions smaller than the receptor can resolve at the determined viewing distance and the convex and concave portions thereof are shaped to provide overlapping images at that viewing distance, each element therefore being perceived as a point source of that portion of the projected image displayed thereon. Because of the highly efficient surface and the arrangement of the matrix, the device is highly directional and thus provides substantially improved image quality, gain and intensity. The device is particularly suitable for use in the projection of visual images, and may be utilized in conjunction with a directional control apparatus to tailor the viewing area to particular environmental conditions.

26 Claims, 20 Drawing Figures

BEAM EMISSION CONTROL MEANS

BACKGROUND OF THE INVENTION

The present invention relates generally to beam emission control means of either a reflective or transmissive nature, and more particularly to such means as may be utilized in projection screens and the like.

Previous projection screens typically have utilized small, randomly oriented diffusive, reflective or refractive particles embedded in or on the screen to reflect or refract the image incident thereon to the observers. Such screens provide poor gain relative to ambient light, because a considerable portion of the incident light is randomly directed to points outside of the field of observation or is absorbed in the screen surface. For this reason such screens are capable of practical application only under conditions substantially free of extraneous light.

In Mihalakis U.S. Pat. Nos. 2,804,801 ('801) and 2,984,152 ('152), a projection screen was disclosed whereby substantial boundary control of the reflected light could be achieved, while at the same time substantially excluding extraneous light, thereby considerably increasing the quantum of incident light comprising the image reflected to the field of observation and thereby enhancing the contrast of the reflected image relative to surrounding lighting conditions. The screen comprised an essentially corrugated surface of high specularity, having a curvature undulating from concave to convex lengthwise of the corrugations. Each undulation was of such small size that the image reflected from each undulation appeared to a viewer to be essentially a point source of the image impinging thereon, and the aggregation of all such point source images provided a composite of the image projected on the entire screen. Because of the undulating nature of the specular screen surface, substantially all the light impinging on the screen from a "projection zone" was returned to a field of observation defined by the geometry of the undulations; that is, the screen provided containment of the impinging image within a predetermined zone of reception. At the same time, a substantial amount of the extraneous light impinging on the screen from outside the projection zone was reflected away from the field of observation. The combined result of these effects was to provide a screen with improved contrast with respect to ambient light.

While the projection screen disclosed in the '801 and '152 patents represented a substantial advance over earlier conventional projection screens, that screen did have some limitations. Reduced to its simplest components, the screen consisted of four basic elements: a first concave surface, a first convex surface, and two portions having both concave and convex surfaces. More particularly, the wholly concave and wholly convex elements provided far less than optimum image-forming power, which therefore resulted in less useable light reaching the viewing area. Thus the '801 and '152 projection screens had significant limitations.

SUMMARY OF THE INVENTION

The present invention substantially eliminates the above described limitations of the projection screen disclosed in the '801 and '152 patents by providing a beam emission control means comprising a matrix of a juxtaposed plurality of a highly reflective or refractive element having both concave and convex portions which may be similar to those of one or both of the compound curved elements of the '801 and '152 disclosures. Because of the design of this element, it functions both as a concave and convex surface, thereby providing two images of that portion of the projected display impinging thereon: one virtual and erect and a second real and inverted.

The dimensions of the element will vary depending on the application, and are usually calculated to ensure that each element subtends an observation angle less than that which can be resolved by the receptor at the determined viewing distance, which is typically about one minute of arc for the human eye but varies with the receptor used. This typically prevents the receptor from resolving the two images defined by each element, so that even though the images are not identical, they appear as a single point to the receptor at the viewing distance. By providing an appropriately configured matrix comprising a plurality of these elements, it becomes possible to define a continuous image at the viewing distance.

The arrangement of the matrix of elements according to the present invention provides containment of the impinging image within a determined zone of reception but also provides substantially increased gain relative to the '801 and '152 patents because of the dual image forming characteristics of the individual elements. Thus the contrast of the image is substantially improved with respect to extraneous electro-magnetic energy. In the optical region, this results in a projection screen generally suitable for use even in high extraneous ambient energy levels such as bright sunlight.

The highly directional nature of the matrix of elements makes it possible to direct the emitted image to an asymmetrically shaped zone of reception if desired or if necessitated by environmental conditions. This may be accomplished by reorienting the matrix and/or by imparting a tilt, curvature or "bow" to the matrix in the appropriate direction.

It is therefore one object of the present invention to provide an improved beam emission control means.

Another object of the present invention is to provide an improved projection screen.

Still another object of this invention is to provide a projection screen having an improved gain characteristic.

A further object of the present invention is to provide a projection screen which is substantially insensitive to extraneous light.

Still another object of the present invention is to provide a controlled beam emission means wherein a plurality of point sources combine to provide a continuous image.

A further object of the present invention is to provide a projection screen which provides improved containment of the image impinging on the screen by providing improved gain characteristics.

An additional object is to provide a matrix of elements having dual imaging capabilities arranged to form a single continuous image.

A still further object of the present invention is to provide an apparatus for directing a contained image from a projection screen to a desired area of observation.

These and other objects will be better understood by referring to the attached figures taken together with the detailed description of the invention which follows.

DETAILED DESCRIPTION OF THE INVENTION

Figures 1, 2A, 2B, 2C, 2D:
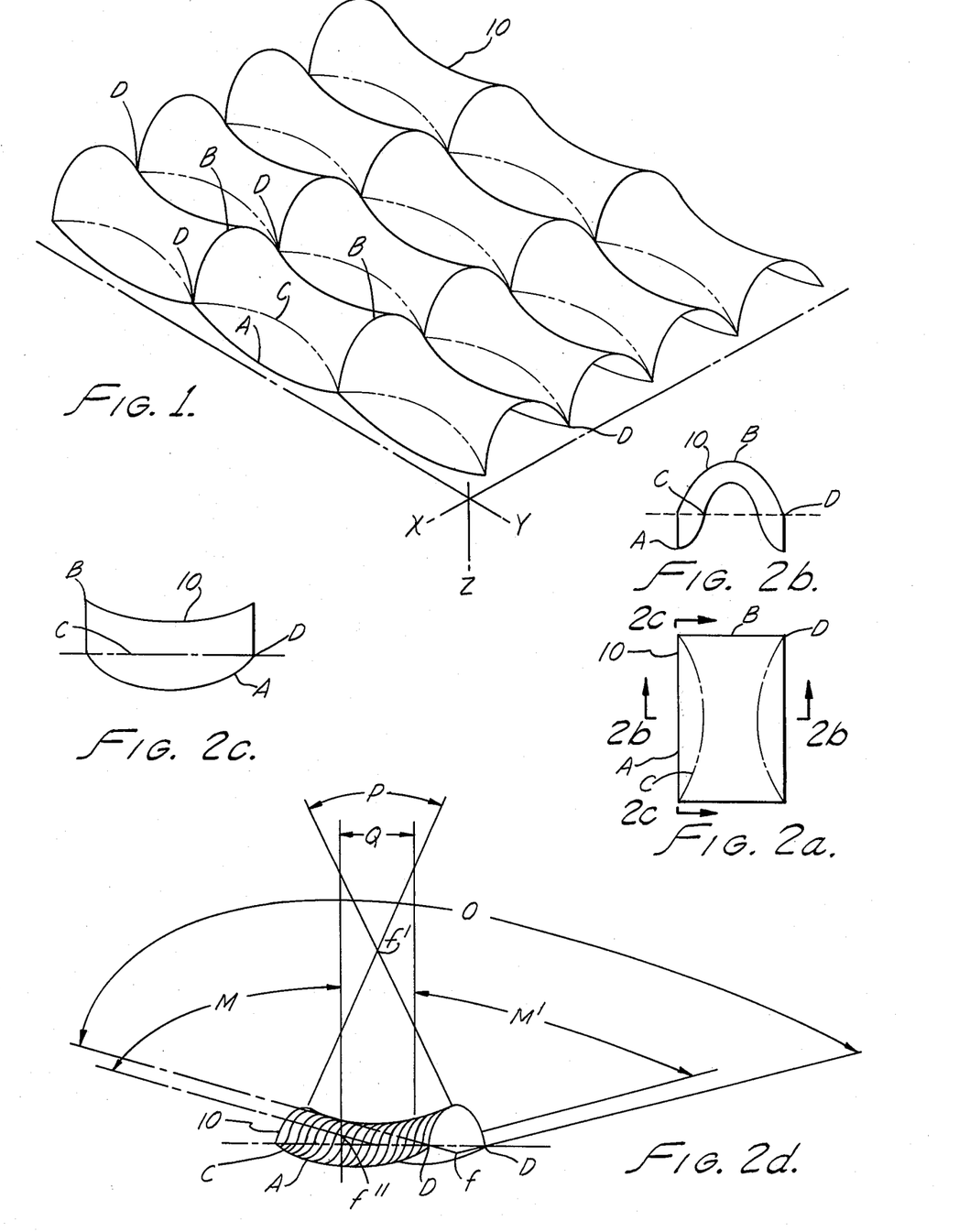
FIG. 1 is a perspective view of a portion of a beam emission control means according to the invention.
FIGS. 2a-2d are top, end, side and partial perspective views, respectively, of an individual element according to the invention.

Referring now to FIG. 1, a portion of a beam emission control means constructed according to the present invention is shown, comprising a plurality of elements 10 juxtaposed to form a matrix of rows and columns. For purposes of example only, the matrix is shown as defining a surface with respect to the X-Y-Z planes. As indicated by the curves or lines "A", "B" and "C", the surface defined by the elements extends both above and below the X-Y plane. A linear discontinuity exists at the edges "B" where the elements abut one another above the X-Y plane, there being a point discontinuity at the points labeled "D", which are formed in the X-Y plane at the intersection of the curves "A", "B" and "C". While the elements 10 have been shown in an abutting relationship, which is preferred, such spacing is not required under all circumstances and a gap between elements may be permitted.

The contour of the element 10 may be better appreciated from FIGS. 2a-2d, which illustrate plan, side, end, and partial perspective views, respectively, of the element. Referring first to FIG. 2a, it can be seen that the element is preferably rectangular in plan view, with the phantom line "C" indicating the intersection of the element with the X-Y plane. That part of the element which is beneath the X-Y plane may better be seen from FIGS. 2b-2d. From the FIG. 2b, which is an end view of the element taken along the line 2b—2b of FIG. 2a, the difference in the shape of the element at its midpoint and at its end may be appreciated. The lines A, B and C of FIG. 1 are again illustrated, the line A, which is below the X-Y plane, indicating the line along which marginal portions of adjacent elements abut. From FIG. 2c, a view taken along the line 2c—2c of FIG. 2a, it can be seen that the element surface extends beneath the X-Y plane in its marginal portions, while the ends of the marginal portions terminate on the X-Y plane at the points D. Comparing FIGS. 2b and 2c, as well as FIG. 1, it can be seen that the element defines a concave surface (FIG. 2c) when viewed in the Y-Z plane, but defines a surface whose primary or central portion, that is, the portion above the X-Y plane, is convex when viewed in the X-Z plane.

The complexity of the surface is more apparent from FIG. 2d, which illustrates the element in perspective. For convenience of illustration the element is shown ribbed to accentuate the curvature, although the surface is preferably smooth. The line C again defines the intersection of the element with the X-Y plane, which shows that the marginal portions of the element extend below the X-Y plane in a smooth curve (described in greater detail hereinafter) which intersects the X-Y plane at each end thereof, or at the points labeled "D". FIG. 2d also illustrates the image-forming capability of the element according to the present invention. Assuming for purposes of illustration that the element surface is reflective, it will be observed that the central convex portion of the element defines a field of observation "O", having a focal point f below the convex surface. Similarly, the central concave portion of the element defines a field of observation "P", having a focal point f' located above the concave surface. The concave marginal portions of the element each define a half-field of observation, M and M', respectively, the field M having a focal point f'' located above the concave surface, and the field M' having a similarly located focal point that is not illustrated in FIG. 2d because it is hidden by the element. The narrow area Q represents a portion of the field of observation to which energy is not reflected by the marginal concave portions of the element, although it will be appreciated that this area is included within the fields O and P and within the half-fields defined by the marginal portions of the adjacent elements (not shown).

Arbitrarily defining the element illustrated in FIGS. 2a-2d, that is, an element whose central portion is convex in a plane defined by first and second axes and concave in planes perpendicular thereto, as a "positive" element, it will be seen that identical image-forming characteristics would be achieved by a "negative" element whose contours are the reverse of those of the positive element. Thus, the central portion of such a negative element would be concave in a plane defined by the same first and second axes, and convex in planes perpendicular thereto. Each negative element could also include blending marginal portions that are convex in all three mutually perpendicular planes.

Figure 9A:
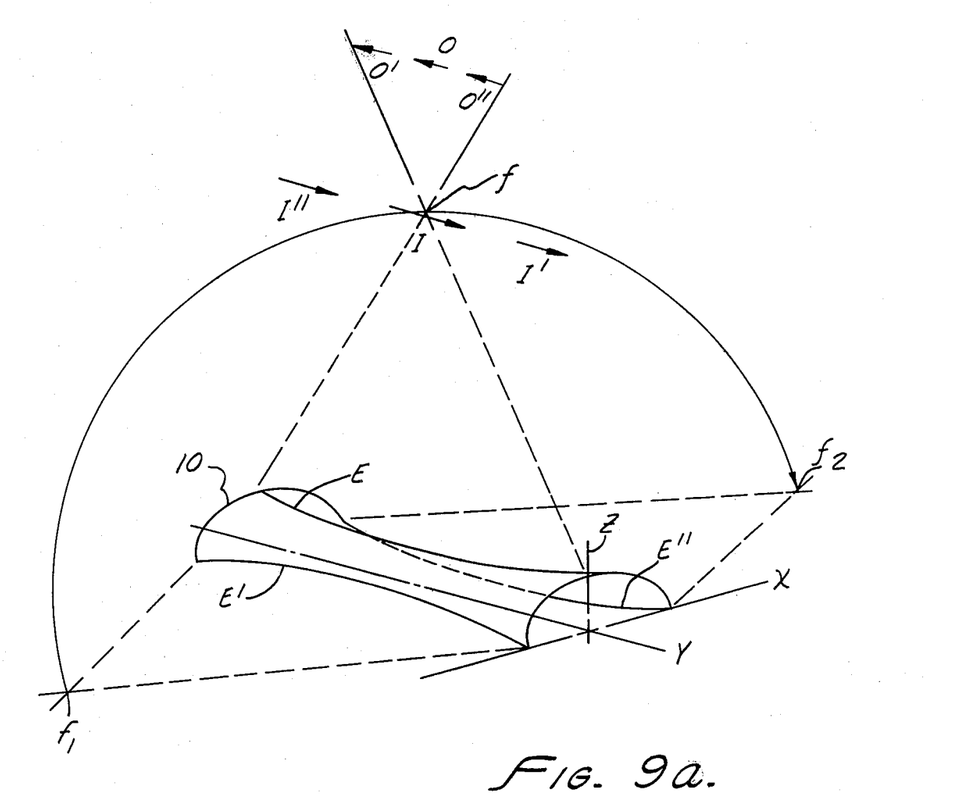
FIGS. 9a-9c are perspective, side, and end views, respectively, of one design of an individual element according to the invention, illustrating the dual imaging capability of the element.

Whether "positive" or "negative" as just described, the element of the present invention thus has a geometric configuration combining the imaging capabilities of both convex and concave surfaces in a single, dual image-forming surface that may be either reflective or transmissive. Thus, the primary or central portion of each element forms two images, one beneath and one above the elemental surface. This property may be better understood by reference to FIGS. 9a-9c, which illustrates the image-forming characteristics of the positive element shown in FIGS. 2a-2d. FIG. 9a is a perspective view of a reflective element 10 oriented longitudinally along the Y axis for illustrative purposes only. The contour of the element 10 in the Y-Z plane is concave, and is here identified as line E. This contour has a focus at the point f, which is the same as the point f' of FIG. 2d. Traversing through an arc to intersect the X-Y plane on either side of the element 10, it is seen that the lines E' and E'', which represent the intersections of the element with X-Y plane and thus are the same as the line C of FIGS. 1 and 2a–2d, describe concave surfaces having focal points at $f_1$ and $f_2$, respectively. The portion of the element that intersects any plane that includes the Y axis, therefore, responds as a concave surface. To illustrate, the object O, which is parallel to the Y axis and lies in the Y-Z plane, is imaged by this concave portion of the element at I. The image I is thus real and inverted. As the object O is moved parallel to the Y axis to the point O', the image is formed at the point I'. Similarly, if the object is located at the point O", the image is formed at the point I".

Figure 9B:
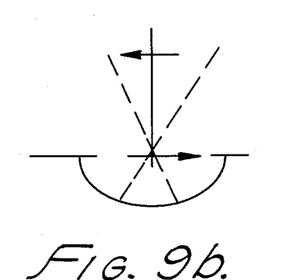

The "inversion of image" principle typical of the response of a concave reflective surface is illustrated in FIG. 9b. It may be seen from this schematic illustration that the surface just described is concave and forms an image that is real and inverted.

Figure 9C:
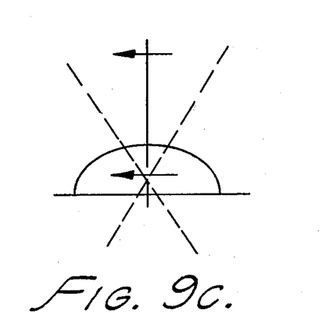

From FIG. 9a it will be observed that any section taken through the element 10 and parallel to the X-Z plane will describe a convex surface. Assuming as before that the surface is reflective, an image that is virtual and erect will be formed thereby. This property is illustrated in FIG. 9c. Thus it is apparent that the central portion of the element 10 combines the functions of both concave and convex surfaces, resulting in dual imaging capability. Similarly, if the surfaces were inverted to form the negative element described above, the central portion of the negative element would retain the dual imaging capability.

Figure 3A:
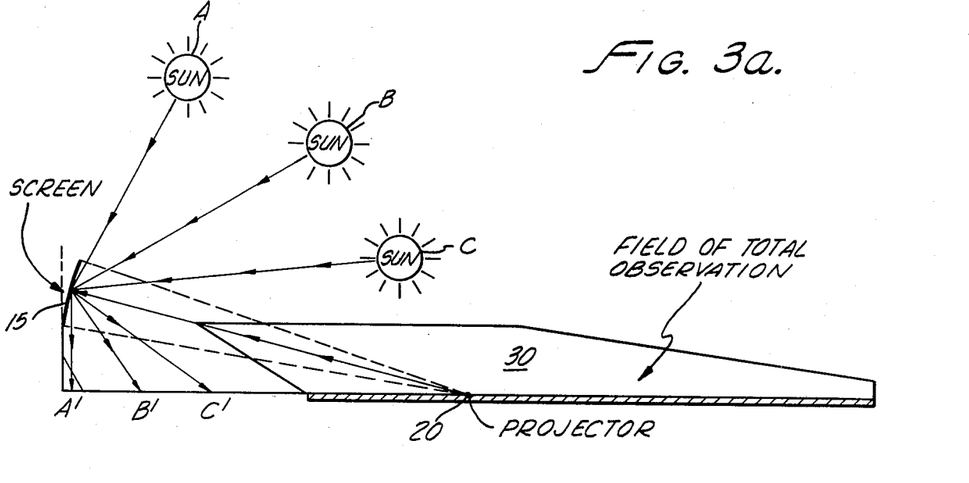
FIGS. 3a and 3b are a side view and a top view, respectively, of one application of a matrix comprising a plurality of elements according to the invention.
Figure 3B:
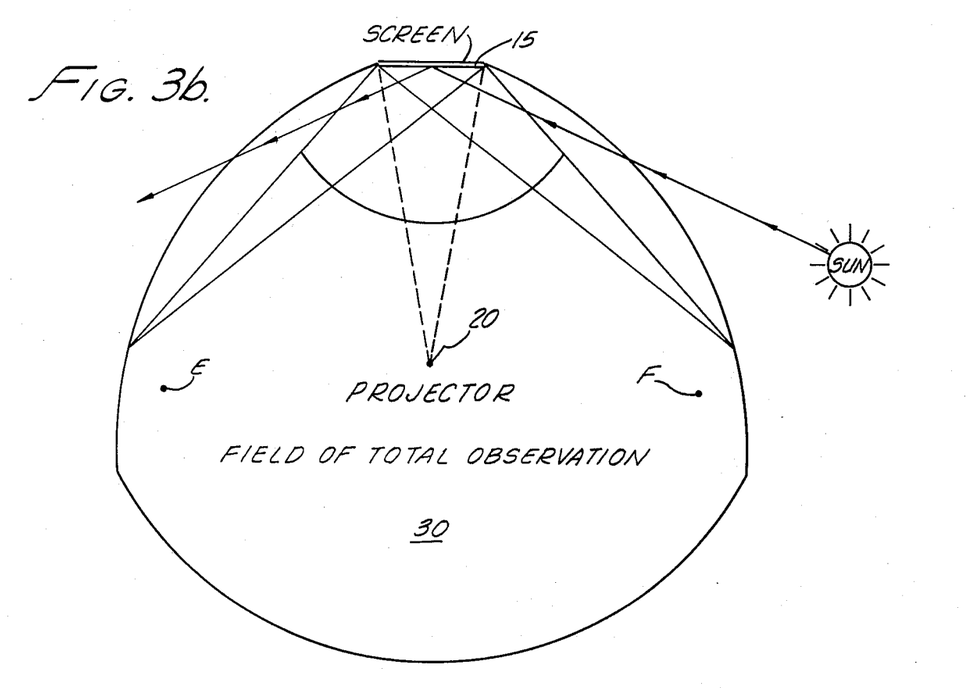

By properly shaping and dimensioning the element 10, and combining the elements so constructed into a matrix as disclosed herein, a screen or controlled beam emission means having the characteristics of the screen 15 shown in FIGS. 3a–3b may be provided. More particularly, the screen 15 of FIGS. 3a–3b receives an image for presentation from a source 20 such as a projector or other source. It should be understood that while the present invention is particularly suited to the controlled reflection or transmission of visual images, it is equally well suited to use throughout the electro-magnetic spectrum by choosing materials for the screen which are appropriate to the wavelength of the impinging radiation and other environmental conditions. For reflection in the visible spectrum, mirror-finish plastic or other materials yielding a highly specular surface are acceptable. For exemplary purposes only, the remainder of the detailed description will treat only the visible portion of the electro-magnetic spectrum. The modifications necessary for use throughout that spectrum are believed apparent to those skilled in the art, given the teachings herein.

The shapes of the screen 15 and the elements 10 thereof cause the energy projected thereon to be directed within a limited presentation area 30 only, again as shown in FIGS. 3a and 3b, which may also be referred to as an area of containment. In a manner similar to that shown in U.S. Pat. No. 2,984,152, the present invention excludes from the area of containment radiation striking the screen from outside the area of containment. Thus, if the screen is outdoors as shown in FIGS. 3a–3b, light from the sun will impinge upon the screen from above the area of containment, and will therefore be reflected into the ground in front of the area of containment. Likewise, extraneous light striking the screen laterally from outside the area of containment is reflected away from the area of containment. Thus the disadvantages of conventional screens using diffusing surfaces are substantially eliminated. The image, or light energy, projected on the screen is more efficiently returned to the area of containment and presents an image which is bright and high in contrast with respect to the ambient lighting conditions.

Also, even extraneous energy originating within the area of containment is not directed by the screen throughout the entire viewing area. Rather, because of the highly directional properties of the matrix of element 10, extraneous energy originating from a point within the area of containment is reflected to the opposite portion of the area of containment. For example, extraneous light originating at the point labeled "E" in FIG. 3b is reflected to an area about the point labeled "F". Thus an image impinging on the screen may be viewed throughout the area of containment only if the image originates from within a "projection zone", to be described in greater detail hereinafter.

Figure 3C:
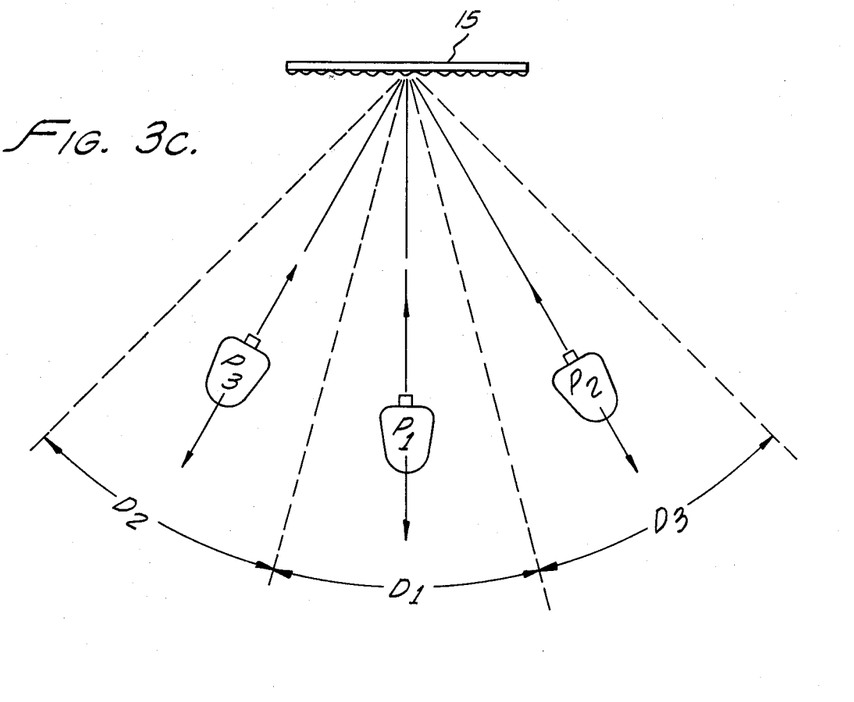
FIG. 3c is a diagrammatic top view of one poly-axial application of the invention.

The highly directional property of a screen built according to the present invention also provides an additional advantage. Because energy impinging on the screen from outside the area of containment is reflected outside the area of containment, it is possible, by providing a screen of properly designed elements, to define a plurality of areas of containment, each receiving a different image from a different projection point. As an example, such an arrangement is shown in FIG. 3c wherein three different areas of containment are provided within three projection zones, each zone providing a distinct image in a full screen display to its associated area of observation. For the example shown in FIG. 3c, the projector P1 provides an image limited to the viewing area D1, while a projector P2 provides an image limited to the viewing area D2, and a projector P3 provides an image to a viewing area D3.

Figures 4A, 4B:
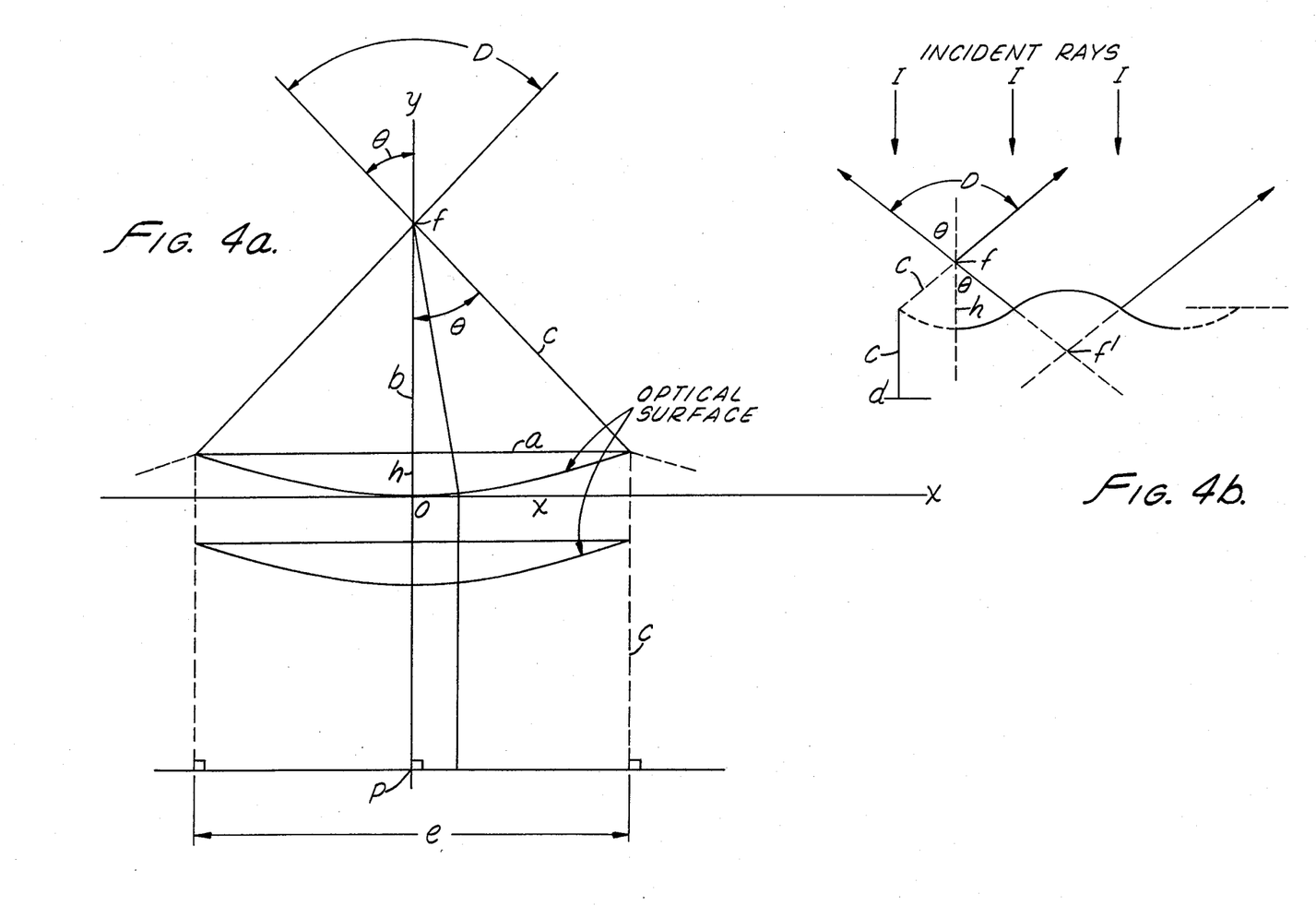
FIGS. 4a-4b are schematic side views of individual elements or portions thereof.

To properly understand the full scope of advantages provided by the present invention, it is necessary to understand the design of the element 10 shown in FIGS. 2a–2d, as well as the arrangement of the element 10 in the matrix as shown in FIG. 1 to provide a controlled beam emission means. Referring to FIGS. 4a–4b, which illustrate a side view and a section view of a single element, there is shown an exit pupil and a focal point f defining an angle of distribution D, which will be a dimension determined by the particular application of the invention. Similarly, the marginal portion of the element, when viewed from the side as shown in FIG. 4a, can be seen in the illustrated embodiment to have the same focus and exit pupil although the focus is shifted downward by an amount equal to the depth of the marginal portion. It should be noted that, as will be more apparent hereinafter, the curves which actually define the surface are preferably parabolic or sinusoidal and not merely arcs of a circle.

When the desired result is a sheer, fully fuzed presentation of the projected display, the physical size of each individual element and the independent elemental image should be essentially subliminal and below the threshold of the viewing sensor's discrete awareness. Since the element by definition is physically smaller than that size which may be resolved at the predetermined viewing distance from the screen by the preselected receptor, the maximum dimensions of the element are substantially fixed once the distance from the screen to the receptor and the vertical and horizontal fields of distribution are established. By determining these maximum dimensions the dual image-forming characteristics of the element are defined.

Figure 5A:
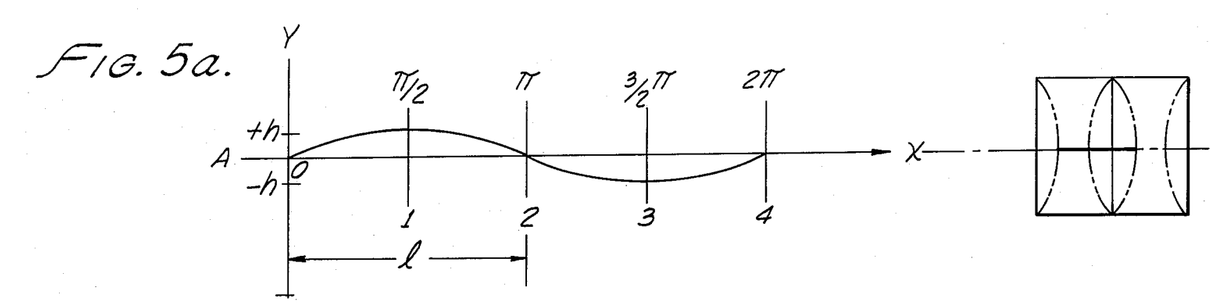
FIGS. 5a-5d show portions of adjoining elements and the curves formed thereby at different points on the element.
Figure 5B:
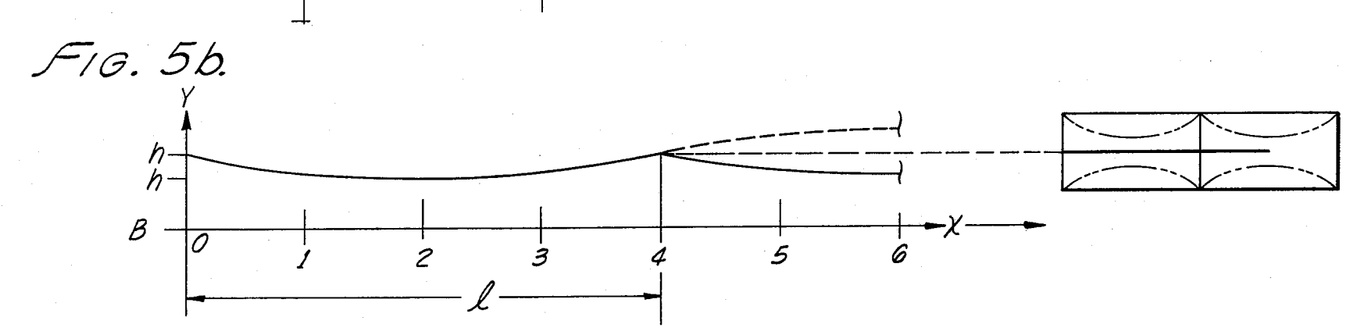
Figure 5C:
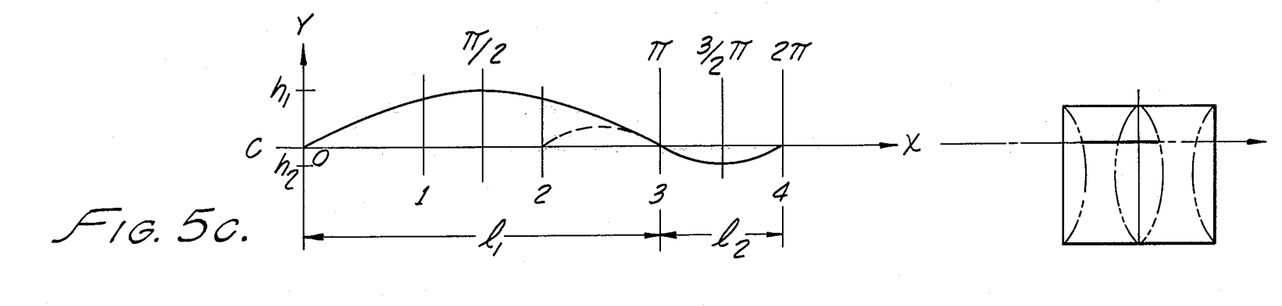
Figure 5D:
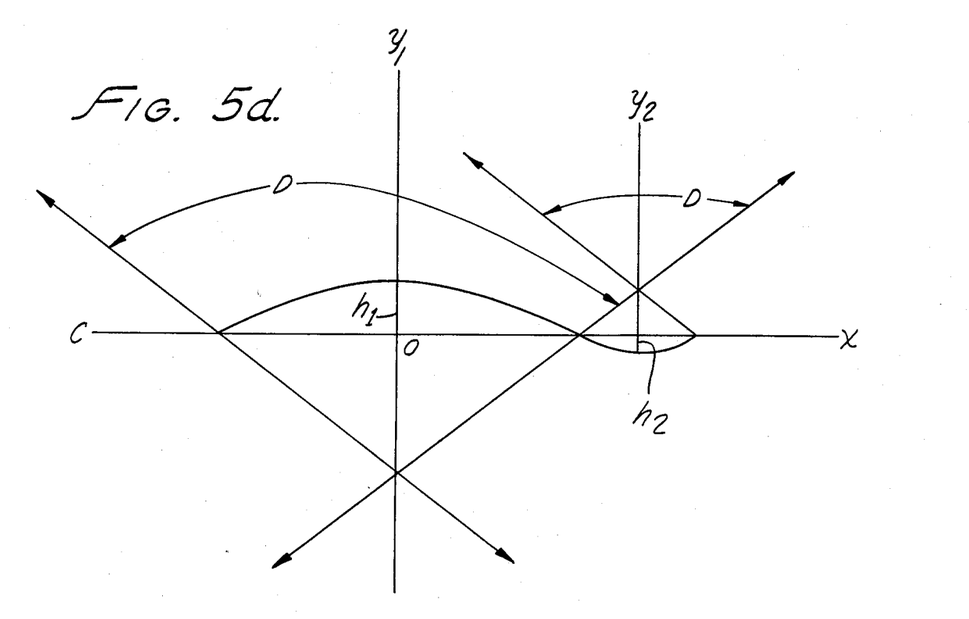

For the purposes of illustration and a means of describing the curves contained herein let adjoining elements be defined as shown in FIGS. 5a-5d, where FIG. 5a illustrates a curve formed latitudinally across the midpoints of adjoining elements. Similarly, FIG. 5b shows the curve formed at the longitudinal axis of two adjoining elements, and FIGS. 5c and 5d show the curve across two adjoining elements one-fourth of the distance from the end of the element. For explanation purposes, these axes may be referred to as "A", "B" and "C", respectively. Since all curves in FIGS. 5a-5d are either pure or composite sinusoidal waveforms, each may be described by the equation:

$$y(x) = h \sin \frac{2\pi x}{T}$$
where $T$ = period.

The equations of the curves along the axes A, B and C then become:

Axis A: $1 = 2, T = 4$
$$y(x) = h \sin \frac{2\pi x}{4} = h \sin \frac{\pi x}{4}$$

Axis B: $1 = 4, T = 8$
$$y(x) = h \sin \frac{2\pi x}{8} = h \sin \frac{\pi x}{4}$$

Axis C: $l_1 = 3; T_1 = 6; l_2 = 1; T_2 = 2$
$$y_1(x) = h_1 \sin \frac{2\pi x}{8} = h_1 \sin \frac{\pi x}{4}$$
$$y_2(x) = h_2 \sin \frac{2\pi x}{2} = h_2 \sin \pi x$$

Referring to FIGS. 5c and 5d, a smoothly undulating curve requires that the slopes for the upper and lower curves be equal at the inflection points, and therefore:

$$\frac{dy_1(x)}{dx} = \frac{h_1 \pi}{3} \cos \frac{\pi x}{3}$$
or at point (3,0)
$$\frac{dy_1}{dx} = \frac{-h_1 \pi}{3}$$
$$\frac{dy_2(x)}{dx} = h_2 \cos \pi x$$
or at point (3,0)
$$\frac{dy_2}{dx} = -h_2 \pi$$

Setting the slopes equal at the inflection point:

$$\frac{-h_1 \pi}{3} = -h_2 \pi$$
$$\frac{h_2}{h_1} = \frac{1}{3}$$

Thus the ratio of heights for this particular example curve is determined to be one-third. It may be seen from FIG. 5d that the distribution angles 'D' of both parts of the composite curve on axis C are equal, regardless of where the two adjoining elements are sectioned.

Referring to FIG. 4a, an example of a possible machine tool design can be obtained by the following method.

Assume for purposes of example the following arbitrary design parameters:
D=distribution angle=90°
e=element size=2x
thus
$\theta$=D/2
a=x
b=a/tan $\theta$
c=a/sin $\theta$
Since the surface is parabolic, by definition:

$c+b=(\overline{pf})=$ distance from p to f and the focal length f from the definition of a parabola is:

$$f = \tfrac{1}{2}(\overline{pf})$$

Then h, the height of the element is:

$$h = f - b$$

One possible set of design parameters may be:

$D = 90°; e = 0.300$ $\theta = 45°; a = x = 0.150,$ which yields:
$b = 0.150$ $c = 0.2121$ $c + b = (\overline{pf}) = 0.3621$ $f = \tfrac{1}{2}(0.3621) = 0.18105$ $h = f - b = 0.0310$ FIG. 1 can thus be appreciated as showing the undulating surface of the elements 10 substantially as described in connection with FIGS. 4a-4b. It will be understood that the foregoing method of calculation applies to the central as well as the marginal portions of the "positive" element, and also applies to the central as well as the marginal portions of the "negative" element. Again, the parabolic surface was chosen only for purposes of calculation and of illustration, and it will be apparent that any other type of curve capable of forming periodic concave and convex undulating waveforms which create the defined element may be utilized; for example, sinusoidal waveforms similar to the parabolic waveforms described may be used for some applications. Also the field of distribution 'D' exists precisely as described only for incident rays which are parallel; the field 'D' will change somewhat for nonparallel incident rays, however the design can be easily modified to compensate for this condition in a manner well known in the art.

Referring again to FIG. 3a, there is illustrated a screen 15 comprising rows and columns of elements according to the present invention as it might be utilized in an outdoor theater. Because the elements comprise a specular reflecting surface in this example, they reflect incident rays only within a limited field of distribution. This effect achieves "containment" of the reflected image within a sharply defined area, called the "field of total observation", as illustrated in FIGS. 3a-3b. Incident light from the projector, located at a prescribed point within the field of total observation, will be reflected into this field, and cannot be observed outside the field. Similarly, incident light from outside the field will be reflected to a point outside the field, as illustrated by the sun in FIGS. 3a-b, and therefore will not interfere with the quality of the image observed within the field of total observation.

However, any other sources of radiation within the field of total observation will be reflected from the screen back into at least a portion of the field, thereby lowering the quality of the observed image. In an outdoor theater application wherein daylight viewing is desired, such sources might include reflections of sunlight from roadway surfaces, fences, buildings and the like located within the field of total observation. As noted previously, just as incident energy originating from the projection source is directed by the screen into the field of total observation, so too is extraneous radiant energy originating within the field directed back into the viewing area. According to the same principle, the "absence of energy" established within the field is directed back into the viewing area and is superimposed onto the projected radiant energy directed thereto. The "brightness gain" of the projected image display is thus a relative term describing the difference between the projected energy and the projected absence of energy, and a higher brightness gain results as this difference increases. By eliminating undesired emissions within the field of observation, therefore, a field of darkness is established which is "beamed" by the screen. For maximum gain, therefore, all potentially image-degrading sources of radiant energy within the field of total observation should be eliminated or minimized, as by coating with non-emissive and/or non-reflective materials well known in the art.

Figures 6, 7, 8:
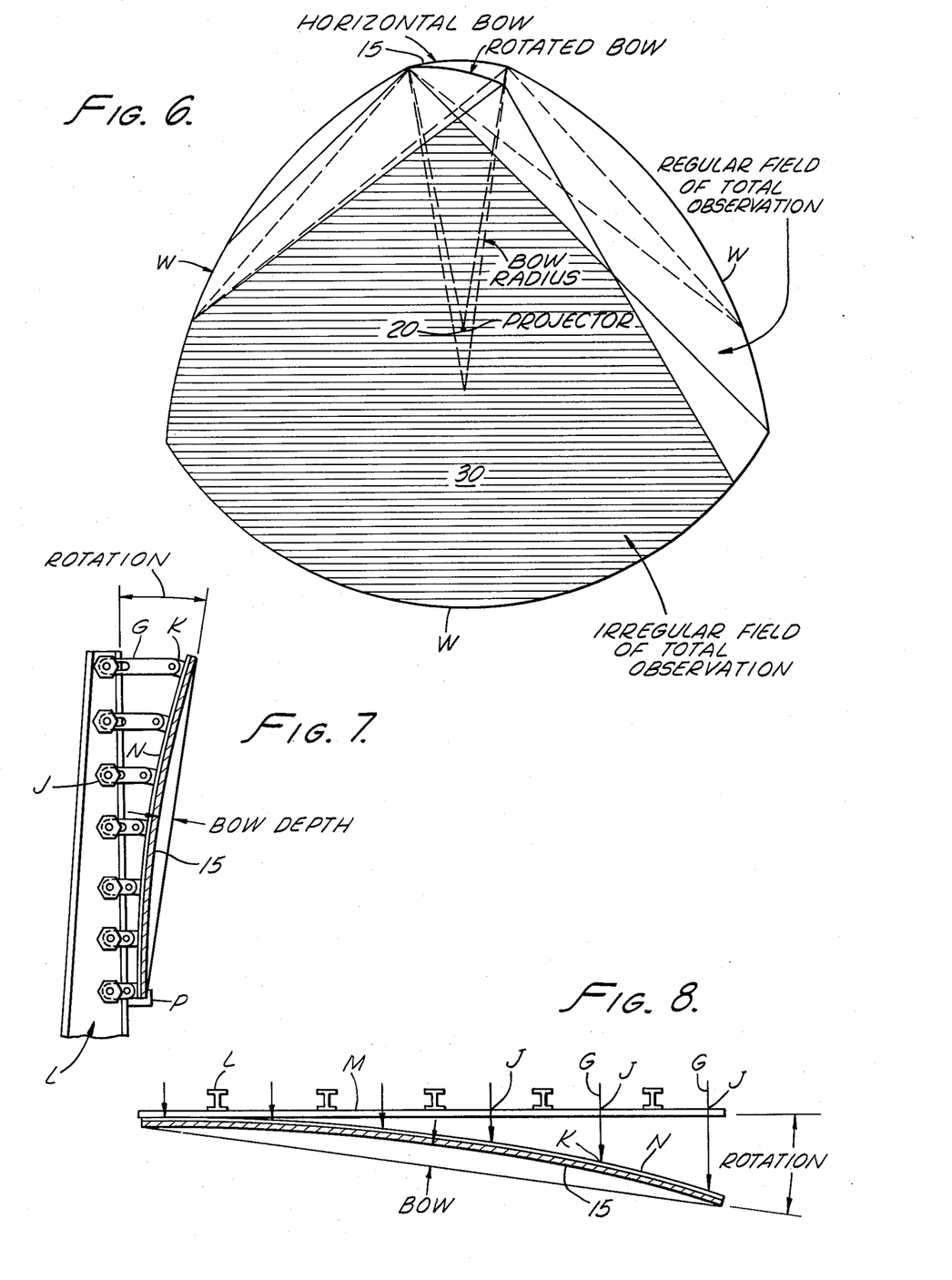
FIG. 6 is a top view of an application as in FIG. 3b, showing a screen configured for an irregular field of observation.
FIGS. 7 and 8 illustrate means for providing vertical and horizontal curvature to the screen of FIGS. 3a-b or FIG. 6.

Likewise, it may be desirable to adapt a screen according to the present invention to an asymmetrically shaped viewing area. This may be achieved by mounting the element array on a surface that may be adjustably oriented or "beamed" in the vertical and horizontal directions by means of an appropriate curvature in each direction. A screen that is beamed "downward", that is, in the vertical direction, is illustrated in FIG. 3a. Similarly, FIG. 6 illustrates a screen with a horizontal curvature to fit an asymmetrical field of observation. The means by which such vertical and horizontal curvature may be achieved are illustrated in FIGS. 7 and 8, respectively. Referring to FIG. 7, attached to support member L by locking means J, are adjustable linkages G, to the other end of which is connected screen support layer N through pivoting means K. Similar linkages are provided in the horizontal direction as illustrated schematically in FIG. 8. Within the mechanical limits of the screen, therefore, any desired curvature of the screen, and any field distribution necessary to adapt to asymmetrically shaped observation areas, may be achieved. Adjustment to fit any particular terrain may be easily accomplished at the time of installation.

For visible light applications the screen surface may be manufactured from stainless steel or a similar highly reflective metal by conventional embossing or other metal forming processes capable of producing highly detailed surfaces and surfaces having good specularity. The finished surface may then be bonded to a flat or bowed surface as desired. The surface may also be formed in plastic by many forming or molding processes depending upon the properties of the selected plastic material, and can be plated with a highly reflective layer before or after forming. As will be appreciated by those skilled in the art, the present invention may also be configured for transmissive operation. In the transmissive embodiment of the present invention, the screen may be formed of a suitably transparent material having the element contour on one side and a flat surface on the other side, or having the element contour on both sides. In the latter case the elements may be "positive" on one side of the screen and "negative" on the other, or they may be of the same type, either positive or negative, on both sides of the screen, so as to form lens units of a convex or concave sense in planes disposed in a first axis and of the opposite sense in planes disposed in mutually perpendicular axes. All of the above described characteristics, including brightness gain and field containment, are exhibited in the transmissive embodiment.

Although a preferred embodiment of the present invention has been described with reference to reflection of visible light rays, it will be apparent that transmissive surfaces may also be employed, and that confinement of transmitted energy from the surface to a predetermined field of energy distribution is not limited to the visible spectrum. Tests have shown that high gain, and therefore improved containment are achieved also in the far infrared and ultraviolet portions of the electro-magnetic spectrum. By choosing suitable element dimensions and reflective or transmissive media, control and containment of energy with optimum gain may be achieved throughout the electro-magnetic spectrum. Similarly, confinement of incident sound waves may be achieved in accordance with the principles of the present invention.

Also, although the illustrated embodiment of the present invention includes smoothly blending marginal portions of the element to eliminate undesired secondary scattering and to maximize gain, and also for ease of manufacturing, these portions are not essential to the practice of the present invention in all applications. Further, the present invention is of course not limited to the illustrated configuration of the element and the matrix of elements, but extends to all configurations of elements and matrices utilizing the teachings incorporated herein. It is to be understood, therefore, that the present invention is not to be limited to the embodiment described and illustrated, but only to the lawful scope of the appended claims.

I claim:

1. Apparatus having an improved gain characteristic for effecting control of beams emitted therefrom as a function of beams incident thereupon, comprising a plurality of similar units disposed in substantially contiguous relation, each unit including an emitting surface which is convex in a plane defined by first and second axes and concave in planes perpendicular thereto.

2. Apparatus having an improved gain characteristic for effecting control of beams emitted therefrom as a function of beams incident thereupon, comprising a plurality of similar units disposed in substantially contiguous relation, each unit including an emitting surface which is concave in a plane defined by first and second axes and convex in planes perpendicular thereto.

3. Apparatus having an improved gain characteristic for effecting control of beams emitted therefrom as a function of beams incident thereupon, comprising
   a plurality of similar units having emitting surfaces disposed in substantially contiguous relation,
   each unit including a primary portion whose surface is convex in a plane defined by first and second axes and concave in planes perpendicular thereto, and secondary portions blending with said primary portion.

4. Apparatus having an improved gain characteristic for effecting control of beams emitted therefrom as a function of beams incident thereupon, comprising
   a plurality of similar units having emitting surfaces disposed in substantially contiguous relation,
   each unit having a primary portion whose surface is concave in a plane defined by first and second axes and convex in planes perpendicular thereto, and secondary portions blending with said primary portion.

5. Apparatus having an improved gain characteristic for effecting control of beams emitted therefrom as a function of beams incident thereupon, comprising
a plurality of similar units having emitting surfaces disposed in substantially contiguous relation in rows and columns,
each unit including a central portion whose surface is convex in a plane defined by first and second axes and concave in planes perpendicular thereto, and a pair of marginal portions blending with opposite sides of said central portion, the surfaces of said marginal portions being concave in all three mutually perpendicular planes.

6. Apparatus having an improved gain characteristic for effecting control of beams emitted therefrom as a function of beams incident thereupon comprising
a plurality of similar units having emitting surfaces disposed in substantially contiguous relation in rows and columns,
each unit having a central portion whose surface is concave in a plane defined by first and second axes and convex in planes perpendicular thereto, and a pair of marginal portions blending with opposite sides of said central portions, the surfaces of said marginal portions being convex in all three mutually perpendicular planes.

7. A screen apparatus having an improved gain characteristic comprising a plurality of similar beam emission control units disposed substantially contiguously in rows and columns, each unit including a central portion whose emitting surface is convex in a plane defined by first and second axes and concave in planes perpendicular thereto, and a pair of marginal portions blending with opposite sides of said central portion, the emitting surfaces of said marginal portions being concave in all three mutually perpendicular planes.

8. A screen apparatus having an improved gain characteristic comprising a plurality of similar beam emission control units disposed substantially contiguously in rows and columns, each unit including a central portion whose emitting surface is concave in a plane defined by first and second axes and convex in planes perpendicular thereto, and a pair of marginal portions blending with opposite sides of said central portion, the emitting surfaces of said marginal portions being convex in all three mutually perpendicular planes.

9. Apparatus having an improved gain characteristic for effecting control of beams emitted therefrom as a function of beams incident thereupon, comprising a plurality of units disposed in substantially contiguous relation, some of said units including an emitting surface which is convex in a plane defined by first and second axes and concave in planes perpendicular thereto, and others of said units including an emitting surface which is concave in a plane defined by first and second axes and convex in planes perpendicular thereto.

10. A screen apparatus having an improved gain characteristic comprising a plurality of beam emission control units disposed substantially contiguously in rows and columns,
some of said units including a central portion whose surface is convex in a plane defined by first and second axes and concave in planes perpendicular thereto, and a pair of marginal portions blending with opposite sides of said central portion, the surfaces of said marginal portions being concave in all three mutually perpendicular planes, and
others of said units including a central portion whose surface is concave in a plane defined by first and second axes and convex in planes perpendicular thereto, and a pair of marginal portions blending with opposite sides of said central portion, the surfaces of said marginal portions being convex in all three mutually perpendicular planes.

11. Apparatus for effecting control of beams emitted therefrom as a function of beams incident thereupon, comprising a plurality of substantially contiguous units having emitting surfaces which are capable of forming both real and virtual images of a single energy source.

12. Apparatus as defined in claim 1, 2, 3, 4, 5, 6, 7, 8, 9, 10, or 11, wherein said emitting surfaces are reflecting surfaces.

13. Apparatus as defined in claim 1, 2, 3, 4, 5, 6, 7, 8, 9, 10, or 11, wherein said units are optically reflecting units.

14. Apparatus as defined in claim 1 or 2, wherein said units comprise material which is transparent to the beams incident thereupon, whereby incident beams at one side are transmitted therethrough and emitted from the opposite side.

15. Apparatus as defined in claim 3 or 4, wherein said units comprise material which is transparent to the beams incident thereupon, whereby incident beams at one side are transmitted therethrough and emitted from the opposite side.

16. Apparatus as defined in claim 5, 6, 7, 8, 9, or 10, wherein said units comprise material which is transparent to the beams incident thereupon, whereby incident beams at one side are transmitted therethrough and emitted from the opposite side.

17. Apparatus as defined in claim 11, wherein said units comprise material which is transparent to the beam incident thereupon, whereby incident beams at one side are transmitted therethrough and emitted from the opposite side.

18. Apparatus as defined in claim 14, wherein said units are lens units varying in thickness in a plane defined by first and second axes to define lens elements of one sense, and varying in thickness in planes perpendicular thereto to define lens elements of the opposite sense.

19. Apparatus as defined in claim 15, wherein the primary portions of said units are lens units varying in thickness in a plane defined by first and second axes to define lens elements of one sense, and varying in thickness in planes perpendicular thereto to define lens elements of the opposite sense.

20. Apparatus as defined in claim 16, wherein the central portions of said units are lens units varying in thickness in a plane defined by first and second axes to define lens elements of one sense, and varying in thickness in planes perpendicular thereto to define lens elements of the opposite sense.

21. Apparatus as defined in claim 1, 2, 3, 4, 5, 6, 7, 8, 9, 10, or 11, wherein said units are sound reflecting units.

22. Apparatus as defined in claim 1, 2, 3, 4, 5, 6, 7, 8, 9, 10, or 11, further including a support surface upon which said units are disposed, and means for adjustably orienting said support surface in either the horizontal or vertical direction or both.

23. Apparatus as defined in claim 1, 2, 3, 4, 5, 6, 7, 8, 9, 10, or 11, further including a support surface upon which said units are disposed, and means for selectively imparting a curvature to said support surface in either the horizontal or vertical direction or both.

24. Apparatus as defined in claim 22, further including means for selectively imparting a curvature to said support surface in either the horizontal or vertical direction or both.

25. A projection system comprising a source of incident energy, means for directing said incident energy in a substantially controlled manner to a desired field of reception, and means for enhancing the gain characteristic of said system by suppressing extraneous sources of incident energy from within the desired field of reception.

26. A system according to claim 25, wherein said means for enhancing the gain characteristic of said system comprise a coating of energy absorbent material applied to potential sources of extraneous incident energy located within the desired area of reception.

* * * * *